United States Patent
Rodgers et al.

(10) Patent No.: US 6,266,677 B1
(45) Date of Patent: Jul. 24, 2001

(54) SYSTEM AND METHOD FOR ENSURING THE INTEGRITY OF STORED DATA

(75) Inventors: Andrew J Rodgers; Lawrence N Taugher, both of Loveland, CO (US)

(73) Assignee: Hewlett Packard Company, Palo Alto, CA (US)

( * ) Notice: Subject to any disclaimer, the term of this patent is extended or adjusted under 35 U.S.C. 154(b) by 0 days.

(21) Appl. No.: 09/246,337

(22) Filed: Feb. 8, 1999

(51) Int. Cl.$^7$ .................................................. G06F 17/30
(52) U.S. Cl. ............................ 707/200; 707/205; 360/86; 360/90
(58) Field of Search ................................. 707/200, 205; 360/86, 90

(56) References Cited

U.S. PATENT DOCUMENTS

| | | | |
|---|---|---|---|
| 5,253,126 | * 10/1993 | Richmond | 360/53 |
| 5,822,142 | * 10/1998 | Hicken | 360/53 |
| 6,138,201 | * 10/2000 | Rebalski | 711/4 |

FOREIGN PATENT DOCUMENTS

| | | | |
|---|---|---|---|
| 0228257 | 7/1987 | (EP) | G11B/27/36 |
| 0467706A2 | 1/1992 | (EP) | G06F/3/06 |
| 0651389A1 | 5/1995 | (EP) | G11B/20/18 |
| WO89/06428 | 7/1989 | (WO) | G11B/27/36 |
| WO 97/41564 | 11/1997 | (WO) | G11C/29/00 |

OTHER PUBLICATIONS

"Predictive Failure Analysis Of Hardware Errors", IBM Technical Disclosure Bulletin, Armonk, NY, vol. 35, No. 1B, Jun. 1992, pp. 323–324.

"Predictive Failure Analysis Of Reassign Rate", IBM Technical Disclosure Bulletin, Armonk, NY, vol. 35, No. 1B, Jun. 1992, pp. 325–326.

* cited by examiner

Primary Examiner—Jack Choules
Assistant Examiner—Cheryl Lewis

(57) ABSTRACT

A system and method for determining when data stored in a data storage device is becoming unreliable. A list of trigger events is maintained, either on the media, or on a host processor, and the number of trigger events pertaining to data retrieval errors is also maintained either on the disc media or on the host processor. Based upon the trigger events and the running totals, the disc media is scanned for errors from time to time and the error detecting algorithm can change depending upon the respective trigger totals. The triggers are typically representative of events likely to cause errors to occur and can be tailored to different types of storage media 29 Claims, 1 Drawing Sheet

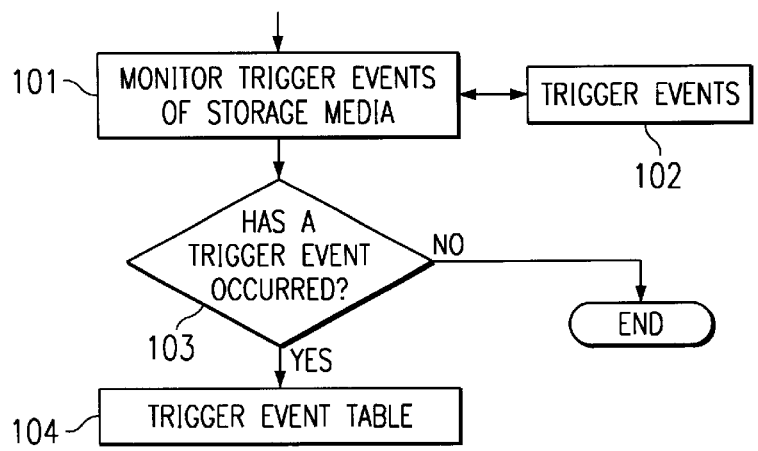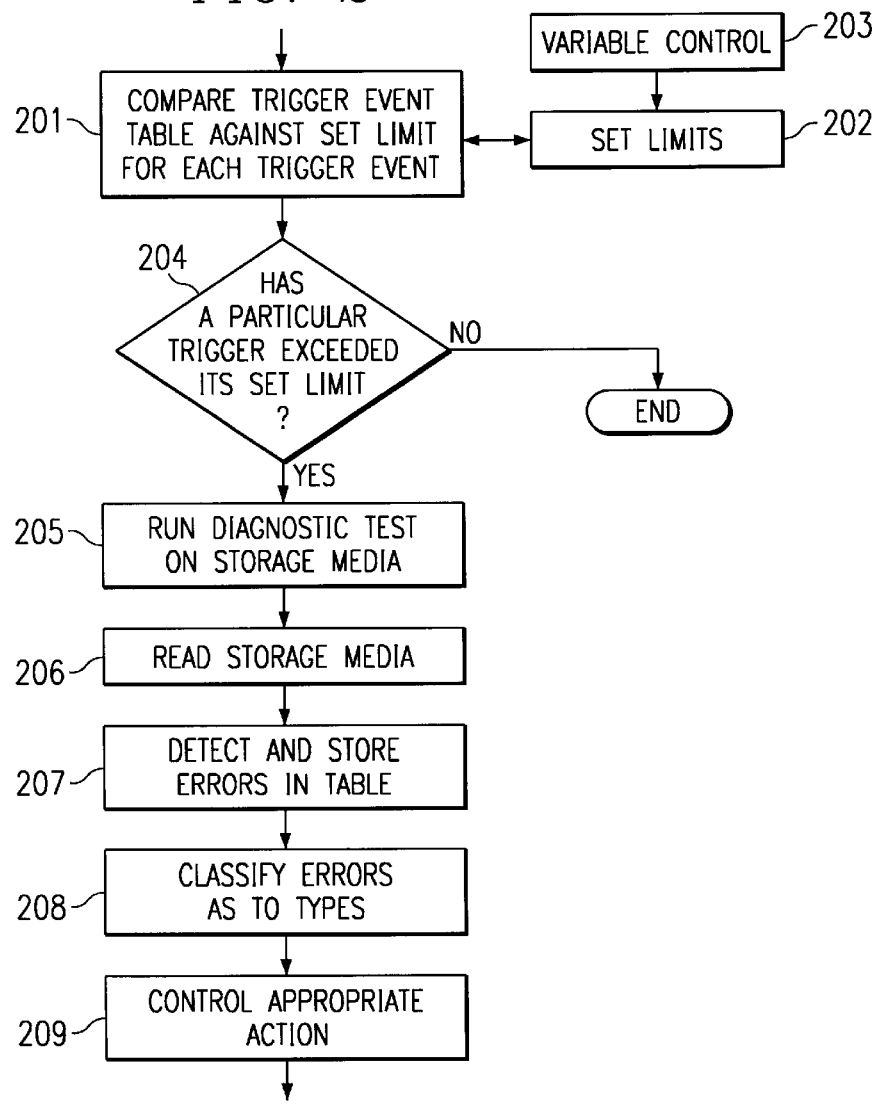

SYSTEM AND METHOD FOR ENSURING THE INTEGRITY OF STORED DATA

BACKGROUND OF THE INVENTION

Data storage devices have methods to ensure the integrity of the data. In one method, called "read-after-write," data is put onto the media, and is then immediately read to ensure that the data was correctly written. There is also a process that separately and non-automatically looks at the media and checks to see that it can be read back from the device. This disc verification is a utility (called ScanDisk) that can be used on current PCs.

The mechanism of read-after-write is disadvantageous in a slow device in that it takes a significant amount of extra time to run that process. For example, a CD has a much slower read and write speed than does a hard drive. The data rates for a CD for writing are something today between 300 and 600 Kbytes per second, and a hard drive is on the order of ten times faster than that. The reading speed of a CD is about six times faster than the writing speed, and a hard drive reading speed is the same as the writing speed. Thus, if the user needs to conduct an operation on a CD where data is written and read back, it will be significantly slower than if the user were able to simply write the data to the disc without verifying it. This is how the file system for CD currently works. Data is written but not verified.

When the user does a format operation to prepare a CD disc for taking data, the system typically writes to that disc to arrange where the data will ultimately be put and then verifies that the data is able to be read back. But after the data has been written, the user has no assurance that something hasn't happened to damage the disc between the time of format and the time of writing data. Any rewritable particular media will be used over a long period of time, and many things can happen to that disc. The disc can be scratched, get fingerprints and dirt on it, etc.—All of these factors will affect both the successful writing of additional data as well as reading of the data.

On a hard disk, the media is in a very controlled, sealed environment. You cannot put a fingerprint on a hard disk. You cannot get dirt on a hard disk. But a removable media is exposed to the environment, thereby making it more vulnerable to damage. CD media is particularly susceptible to this damage because it is the only rewritable media that does not have a protective case (i.e. audio tapes, VCR tapes, floppy disks, etc.) When a user does the formatting and verifying, the disc is physically secure since it is in a device away from fingers, etc. But when the CD is removed from the drive problems arise. This is a significant difference between hard disk and CD technology.

All data storage devices take advantage of error correction designed in the format. There are many error correction algorithms. They are all effective in correcting errors and defects, but every method has limitations. A thick thumb print on a CD disc, for instance, will render sections of the CD disc unreadable. Since this type of reusable media is in a very unprotected environment, it will be handled and is likely to become soiled and damaged at random times over a long period of time. Therefore, a method is needed to ensure the steadfastness of data integrity.

SUMMARY OF THE INVENTION

These and other objects, features and technical advantages are achieved by an improved system and method which automatically performs disc verification on the disc without any user intervention. It would run at appropriate intervals, determined by looking at certain parameters of the disc, in order to insure a minimum risk of either data unreadability or data being written on a location unsuccessfully. The improved system includes the error correction processes that currently apply to CD's, but the algorithms will look at the disc and the usage of the disc, in particular, how much the disc has been handled by a user. It will then determine the appropriate time to automatically run the disc verification function and repair of the disc.

One of the features of the error correction on a CD as compared to a hard disk, is that a hard disk will only tell the user whether the data is good or bad. Either the ECC worked or it did not work to correct the data. CD technology typically set a threshold on how much ECC is used before informing the system to relocate the data because of risk of lost data. CD technology also typically allows for the system to inquire how much ECC was used to read the data. The improved system uses this method of inquiring how much ECC was used to intelligently determine if disc verification is required.

Since the process of assessing, cleaning up the disc, and relocating data is done in the background, this system achieves additional protection without having to do a read back after the write process. Consequently, the improved system gains the performance of a write-it-and-go-on device, while preserving the protection of being able to check the disc at regular and appropriate intervals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a diagram of the operation of the trigger event recording; and

FIG. 2 is a diagram of the operation of error checking as a function of set trigger limits being exceeded.

DETAILED DESCRIPTION OF THE INVENTION

Turning now to FIG. 1, box 101 which advantageously runs on a host processor, such as a PC, or other computing device, monitors the trigger events which occur. The definitions of the trigger events to be monitored are stored on the portable storage medium, (or on the host computer or on a network). Box 102 contains and controls the triggers, which by way of example could be number of media inserts; number of hours of use; number of files that have changed; number of errors or type of errors per hour of use; change in the sparing table; or the differences in the files date and time stamps.

One trigger could be a specified number of times that the media has been inserted into the drive unit of the host processor (not shown). The number of insertions is an indication that someone had to handle it at least x number of times because every time it is inserted it is by a handling process. You don't really know how many other times it has been handled when it is outside the drive so this is a little bit indirect. Each time the disc is inserted in the improved system a counter on the disc would be incremented. When it reached a predetermined value the disc verification process would begin. When completed the counter would be cleared. If data was recovered but took a predetermine amount of ECC the data would be automatically move to a good area on the disc.

A second trigger could be the number of hours of use of the storage media.

The number of hours of use is a further abstraction. The medium could have been sitting inside the drive a long time but the assumption is that after the disc is used so many times it would have been swapped out with other discs. So it is getting at how long the disc has been used and assuming that if it has been used a number of periods of time it would have been removed several times. The system could actually record use on the medium, or on the host. The length of time the disc is in use could be stored on the disc in the improved system. This location would be updated each time the disc was in use. When it reached a predetermined value the disc verification process would begin. When completed this location would be clearer. If data was recovered but took a predetermined amount of ECC the data would be automatically move to a good area on the disc.

A third trigger could be the number of files that have changed. The improved system would watch the number of files that have been written and how many files have been removed. The number of files that have changed (added, modified or deleted) could be stored on the disc in the improved system. This location would be updated each time files changed. When it reached a predetermined value the disc verification process would begin. When completed this location would be cleared. If data was recovered but took a predetermine amount of ECC the data would be automatically move to a good area on the disc.

A fourth trigger is the number and type of errors received. By reading the data the system generates information about how much of the ECC has been involved. That information can be requested along with the data and so the system can set its threshold based on that. In the current CDs there are three levels of error correction. Call them C1, C2 and C3. Basically, C1 and C2 are combined and you get information about how much of C1 and C2 were required to recover the data if there was an error. And then you also get that same information on C3. If C1 and C2 could not correct it, it will go to C3 to correct it and the information as to what level of C3 error correction was required to recover the data is available.

The point is even when you are successful reading the data, you can get some information about how difficult it was and the improved system would utilize the information that is available to make some additional decisions about whether it is appropriate to look for errors on the entire disc.

If the improved system becomes aware that there are a high number of errors occurring during reading, this is an indication that the improved system should look at the entire disc rather than just what the user was reading right then.

The improved system could be set up to readjust the portions that have data or the entire disc. This is important since it increases the likelihood of errors at any location. Running the disc verification routine will allow for the detection of trouble conditions before a user ever tries to write to that area.

If the improved system determines that there are significant portions of bad areas on the disc, it could alert the user that it is time to copy to another disc. Another feature of the improved system is that it will detect contamination and could inform the user to clean the disc before trouble occurs.

The fifth trigger is a change in the sparing table. The sparing table is where the storage device records the places that cannot be written to. The system watches that table and as more locations are added to that table the system knows that the disc is wearing out or that there is additional dirt on the disc. The file system writes that table. So the computer and device as it exists today manage the media and as they are unsuccessful in reading something back or get high error rates they will be relocating data, so our method watches that sparing table and determines when its time to look again at the whole disc.

A fifth trigger could be to determine the difference in data and time between the newest file and the oldest file. This time delta would be saved on the disc. When the delta reaches a predetermined value the disc verification process would begin. When completed this value would be marked as verified. A new time delta would be started from the time delta marked as verified. When this new delta reached a predetermined value the disc verification process would begin. This new time delta would then be stored where the old time delta was and would be marked as verified. If data was recovered but took a predetermine amount of ECC the data would be automatically move to a good area on the disc.

This method is similar to trigger numbers two and three. It has the advantage that continuous monitoring of the files on the disc is not required. It has the disadvantage that only one file of significant time delay could trigger the disc verification process.

Box 103 checks for trigger events and simply logs the various events into table 104. Some trigger events, however, need not be captured in a table since they are in tables already and that table acts as a trigger such that when that table gets too full (for example, the error table) the system reacts.

FIG. 2 shows the control of the algorithm that determines when to initiate a disc verification process automatically. The user will not have to invoke this procedure. Most users do not have the kind of knowledge to know that they should run a disc verification and thus a key point is to put the intelligence into the system to determine when a disc verification should be run. Even a very experienced user would not necessarily know when this should be done, because if the user had a CD for some time and then handed it to a friend, that friend would not know the state of that disc, nor how much it had been handled, nor how long it had been since it had been cleaned up, etc. Additionally, the friend's device may perform differently with the disc. It may read with more or less errors do to better or worse optics. Using this improved system, a portable memory can have multiple users and multiple owners and still be cared for properly.

Box 201 compares the trigger events table against each individual trigger event set limit box 202 to determine if the set limit has been reached. If it has been reached diagnosis are run, box 205, which diagnosing could be a disc verification routine, or could be particular to a given type of trigger, if desired. Note also that the trigger limits can be adjusted, as desired, either by a user, or by the system or from information obtained externally, such as from a network/web.

Box 206 reads the medium and box 207 detects and stores errors, or invokes the error table and blocks certain portions of the medium from further use in cooperation with box 208. In some situations, the trigger event table is updated. Box 205 controls whatever action, such as notifying a user, changing speeds of the system, etc., as appropriate, given the error condition.

There is actually a whole series of protocols that can be used around this concept. One is that nothing is done until the system reaches a certain threshold, for example the error table is 50% full. There could be a nonlinear progression so that as it gets more full disc verification is run more often. Another could be the rate of change you are using the disc and nothing is happening in that table. All of a sudden the system starts to see the table fill up rapidly. The improved system could implement disc verification more often as the rate of that table fills up.

The trigger event list as well as the trigger event occurrence list can be stored on the CD disc, on a public medium or on a host processor. The host processor could transfer one or both of these lists to the portable device at certain times, periodically, or upon certain events, such as the removal of the device from that host, or upon a command from the user.

The improved system described is primarily designed for CD's running in conjunction with a PC or host processor. However, any system using a portable data storage medium can take advantage of the concepts taught herein. For example, DVD's and other storage devices can be scanned to know when their useful life is compromised, or to know when to move data to an alternate storage location before that data is lost forever. In some situations, even the hard drive of the processor can be mainframed in this fashion.

Although the present invention and its advantages have been described in detail, it should be understood that various changes, substitutions and alterations can be made herein without departing from the spirit and scope of the invention as defined by the appended claims.

What is claimed is:

1. A method of improving the long term data integrity of a removable storage medium by automatically detecting when data on a said storage media has reached an unreliable condition, said method comprising the steps of:

maintaining a running total of certain predefined trigger events, wherein said running total is maintained on said media; and checking said portable media data errors in accordance with an established list of said trigger events.

2. The method of claim 1 wherein said established list of trigger events is common to a number of said devices and wherein said running total is unique to said media.

3. The method of claim 1 wherein said established list of trigger events is maintained on said media.

4. The method of claim 1 wherein said trigger events is maintained on a host device to which said portable device is temporarily connected.

5. The method of claim 1 wherein said running totals are maintained on a host device to which said portable media is temporarily connected.

6. The method of claim 5 wherein said host device maintained totals are transferred to said portable media from time to time.

7. The method of claim 1 wherein said checking step includes the step of:

tailoring said checking frequency to the past history of said media.

8. The method of claim 1 wherein said checking step includes the steps of:

determining which type of check should be performed at any given time; and tailoring the type of check to the past history of said media.

9. The method of claim 1 wherein said trigger events are selected from the list consisting of:

a) number of media inserts;

b) number of hours of use;

c) number of files that have changed;

d) number of errors per measure period;

e) certain changes of the sparing table.

10. The method of claim 1, wherein at least some of said steps are performed on at least one host processor to which said storage media is associated.

11. A system for determining when a media has reached an unreliable condition, said system comprising:

a portion for maintaining a series of trigger events; and a portion for maintaining a running total of said trigger events for said media, wherein said running total is maintained on said media.

12. The system of claim 11 wherein said system further includes a portion for checking said media for data errors in accordance with said established list of trigger events, said checking portion operating in conjunction with said running total of trigger events for said media.

13. The system of claim 11 wherein said series of trigger events is common to a number of devices and wherein said running total is unique to said media.

14. The system of claim 11 wherein said trigger events are maintained on said media.

15. The system of claim 11 further comprising:

a portion residing on a host device to which a portable device associated with said media is temporarily connected, said host residing portion operable for maintaining said running totals of said trigger events.

16. The system of claim 11 wherein said checking portion includes:

a portion for tailoring said checking frequency to the past history of said media.

17. The system of claim 11 wherein said checking portion includes:

a portion for determining which type of check should be performed at any given time; and a portion for tailoring the type of check to the past history of said media.

18. The system of claim 11, wherein said system includes a host processor for transforming data back and forth between a portable device associated with said media and said host processor.

19. A system for determining when to check a media for possible trouble conditions, said system comprising:

means for determining when certain pre-established trigger events have occurred, with respect to said media;

means for maintaining a running total of said pre-established trigger events, wherein said running total is maintained on said media; and means for checking said media for data errors when said running total for any one trigger event reaches a preset limit.

20. The system of claim 19 wherein said trigger events are common to a number of devices and wherein said running total is unique to said media.

21. The system of claim 19 wherein a list of said pre-established trigger events is maintained on said media.

22. The system of claim 19 further including:
means for maintaining a list of said trigger events on a host device to which a portable device associated with said media is temporarily connected.

23. The system of claim 19 further including:
means for maintaining said running totals on a host device to which a portable device associated with said media is temporarily connected.

24. The system of claim 23 further including:
means for transferring said host device maintained totals to said media from time to time.

25. The system of claim 19 wherein said checking means includes:
means for tailoring said checking frequency to the past history of said media.

26. The system of claim 19 wherein said checking means includes:
means for determining which type of check should be performed at any given time; and
means for tailoring the type of check to the past history of said media.

27. The system of claim 19 wherein said trigger events are selected from the list consisting of:
a) number of media inserts;
b) number of hours of use;
c) number of files that have changed;
d) number of errors per measure period;
e) certain changes of the sparing table.

28. The system of claim 19 wherein said system operates, at least in point, on a host processor.

29. A method for increasing data reliability of a media, comprising:
detecting whether an event occurs, wherein the event is selected from the list of a) insert of said media; b) length of use of said media; c) file changes on said media; and d) sparing table changes on said media;
when said event is detected, updating a running total stored on said media pertaining to occurrences of said event;
determining whether said running total exceeds a threshold value; and
when said running total exceeds the threshold value, automatically performing a disk verification background procedure, wherein the background procedure includes assessing the media, blocking further use of certain portions of said media, and relocating data on said media.

* * * * *